(12) United States Patent
Crisler

(10) Patent No.: US 9,041,598 B2
(45) Date of Patent: May 26, 2015

(54) NON DOPPLER-TOLERANT PULSE COMPRESSION IN RADAR SYSTEMS

(75) Inventor: Robert E. Crisler, Burlington, MA (US)

(73) Assignee: Raytheon Company, Waltham, MA (US)

(*) Notice: Subject to any disclaimer, the term of this patent is extended or adjusted under 35 U.S.C. 154(b) by 794 days.

(21) Appl. No.: 13/165,986

(22) Filed: Jun. 22, 2011

(65) Prior Publication Data

US 2012/0326920 A1 Dec. 27, 2012

(51) Int. Cl.
*G01S 13/00* (2006.01)
*G01S 13/28* (2006.01)
*G01S 13/524* (2006.01)
*G01S 7/28* (2006.01)

(52) U.S. Cl.
CPC ............. *G01S 13/282* (2013.01); *G01S 7/2813* (2013.01); *G01S 13/524* (2013.01)

(58) Field of Classification Search
CPC ... G01S 7/2813; G01S 17/362; G01S 12/282; G01S 13/524
USPC ......................................................... 342/196
See application file for complete search history.

(56) References Cited

U.S. PATENT DOCUMENTS

| | | | |
|---|---|---|---|
| 5,103,233 A * | 4/1992 | Gallagher et al. ............ 342/408 |
| 5,151,702 A * | 9/1992 | Urkowitz ...................... 342/134 |
| 5,208,785 A * | 5/1993 | Brumley et al. ................ 367/90 |
| 5,229,775 A * | 7/1993 | Sakamoto et al. ............ 342/160 |
| 5,309,161 A * | 5/1994 | Urkowitz et al. ............. 342/132 |
| 5,414,428 A * | 5/1995 | Gallagher et al. ............ 342/132 |
| 7,130,292 B2 * | 10/2006 | Turpin et al. ................. 370/342 |
| 7,646,330 B2 * | 1/2010 | Karr ............................... 342/44 |
| 2011/0102250 A1 * | 5/2011 | Venkatachalam et al. .. 342/26 R |

OTHER PUBLICATIONS

Wikipedia article, "Signal-to-Noise Ratio", Jun. 7, 2010 version.*
Keith Frampton et al.; Advanced Optical Processor for Arbitrary Waveform Radar Imaging; IEEE; pp. 387-389; 2006.
Keith Frampton et al.; Hybrid Optical/Digital Processor for Radar Imaging; High Performance Embedded Computing Workshop at MIT/LL; Sep. 23-25, 2003.

* cited by examiner

*Primary Examiner* — Frank J McGue
(74) *Attorney, Agent, or Firm* — Burns & Levinson LLP; Joseph M. Maraia

(57) ABSTRACT

A method for processing return radar waveforms in response to transmitted radar waveforms. The method includes receiving, with a processor, a return radar waveform having a Doppler shift larger than Doppler tolerance. The method also includes separating, with the processor, the return radar waveform into a plurality of shortened waveforms. The method also includes compressing, with the processor, each of the plurality of shortened waveforms with a shortened form of the return radar waveform. The method also includes summing, with the processor, the plurality of compressed, shortened waveforms by computing a Doppler Fourier transform for each radar range bin of the return radar waveform using the plurality of compressed, shortened waveforms.

12 Claims, 2 Drawing Sheets

NON DOPPLER-TOLERANT PULSE COMPRESSION IN RADAR SYSTEMS

FIELD OF THE INVENTION

The currently described invention relates to systems and methods for processing radar waveforms in radar systems.

BACKGROUND

Prior art methods for processing non Doppler-tolerant waveforms in radar signals require multiple pulse compression steps for each Doppler bin. These methods are computationally intensive and inefficient. A need therefore exists for improved systems and methods for processing radar waveforms in radar systems.

SUMMARY

Embodiments described herein include methods for processing non-Doppler tolerant waveforms using a single pulse compression step followed by a Doppler Fourier transform for each Doppler bin, rather than the traditional approach of pulse compressing non-Doppler tolerant waveforms by performing a separate pulse compression step for each Doppler bin. The method includes breaking up a return radar waveform into shorter pieces, where each piece is short enough to include the Doppler bandwidth of interest. Each piece is then compressed with a shorter replica that is derived from the long pulse. In this manner, the compression of the sub-pulses need only be performed once.

One embodiment features a method for processing return radar waveforms in response to transmitted radar waveforms. The method includes receiving, with a processor, a return radar waveform having a Doppler shift larger than Doppler tolerance. The method also includes separating, with the processor, the return radar waveform into a plurality of shortened waveforms. The method also includes compressing, with the processor, each of the plurality of shortened waveforms with a shortened form of the return radar waveform. The method also includes summing, with the processor, the plurality of compressed, shortened waveforms by computing a Doppler Fourier transform for each radar range bin of the return radar waveform using the plurality of compressed, shortened waveforms.

In some embodiments, the method includes separating the return radar waveform into a plurality of shortened waveforms each having a prespecified bandwidth small enough to neglect Doppler effects. In some embodiments, the prespecified bandwidth is determined in accordance with equation:

$$SNR = 10 * \log_{10}\left(\frac{\sin(\pi f_d / \tau_{pw})}{\pi f_d / \tau_{pw}}\right)$$

where SNR is a prespecified signal-to-noise ratio for the system, $f_d$ is the Doppler shift, and $\tau_{pw}$ the prespecified bandwidth.

In some embodiments, compressing each of the plurality of shortened waveforms with a shortened form of the return radar waveform includes selecting a correlator having a length that is the lesser of a required range window or length of each of the shortened waveforms. In some embodiments, compressing each of the plurality of shortened waveforms with a shortened form of the return radar waveform includes convolving each of the plurality of shortened waveforms with a plurality of corresponding segments of a conjugated and time-reversed version of the transmitted radar signal. In some embodiments, compressing each of the plurality of shortened waveforms with a shortened form of the return radar waveform includes convolving each of the plurality of shortened waveforms with a plurality of corresponding conjugated time-reversed segments of the transmitted radar signal that have been adjusted for time stretching or compression due to high target speed.

Another embodiment features a system for processing return radar waveforms in response to transmitted radar waveforms. The system includes a radar signal receiver for receiving a return radar waveform having a Doppler shift larger than Doppler tolerance of the system. The system also includes a processor for separating the return radar waveform into a plurality of shortened waveforms, compressing each of the plurality of shortened waveforms with a shortened form of the return radar waveform, and summing the plurality of compressed, shortened waveforms by computing a Doppler Fourier transform for each radar range bin of the return radar waveform using the plurality of compressed, shortened waveforms.

Another embodiment features a computer program product, tangibly embodied in an information carrier. The computer program product includes instructions being operable to cause a radar waveform processing module to receive a return radar waveform having a Doppler shift larger than Doppler tolerance, separate the return radar waveform into a plurality of shortened waveforms, compress each of the plurality of shortened waveforms with a shortened form of the return radar waveform, and sum the plurality of compressed, shortened waveforms by computing a Doppler Fourier transform for each radar range bin of the return radar waveform using the plurality of compressed, shortened waveforms.

In some embodiments, the computer program product includes instructions operable to cause a radar waveform processing module to separate the return radar waveform into a plurality of shortened waveforms each having a prespecified bandwidth small enough to neglect Doppler effects. In some embodiments, the computer program product includes instructions operable to cause a radar waveform processing module to compress each of the plurality of shortened waveforms with a shortened form of the return radar waveform by selecting a correlator having a length that is the lesser of a required range window or length of each of the shortened waveforms.

In some embodiments, compressing each of the plurality of shortened waveforms with a shortened form of the return radar waveform includes convolving each of the plurality of shortened waveforms with a plurality of corresponding segments of a conjugated and time-reversed version of the transmitted radar signal. In some embodiments, compressing each of the plurality of shortened waveforms with a shortened form of the return radar waveform includes convolving each of the plurality of shortened waveforms with a plurality of corresponding conjugated time-reversed segments of the transmitted radar signal that have been adjusted for time stretching or compression due to high target speed.

Other aspects and advantages of the current invention will become apparent from the following detailed description, taken in conjunction with the accompanying drawings, illustrating the principles of the invention by way of example only.

BRIEF DESCRIPTION OF THE DRAWINGS

The foregoing features of various embodiments of the invention will be more readily understood by reference to the following detailed descriptions in the accompanying drawings, in which.

DETAILED DESCRIPTION OF ILLUSTRATIVE EMBODIMENTS

The embodiments described herein reduce the processing of non-Doppler tolerant waveforms to one pass through a pulse compression step followed by a Doppler Fourier transform for each Doppler bin. This greatly reduces the processing demands. The approach involves breaking up a waveform into smaller pieces where each piece is short enough to have the Doppler bandwidth of interest. Each piece is compressed with a shorter replica derived from the original, long pulse that is appropriate for that particular sub-pulse. The phase run-out due to the Doppler shift is then compensated post pulse compression and the compressed pulse is recovered by summing the compensated sub-pulses. In some embodiments, the summing step is performed using a Doppler Fourier transform for each Doppler range bin. The compression of the sub-pulses need only be performed once.

Figure 1:
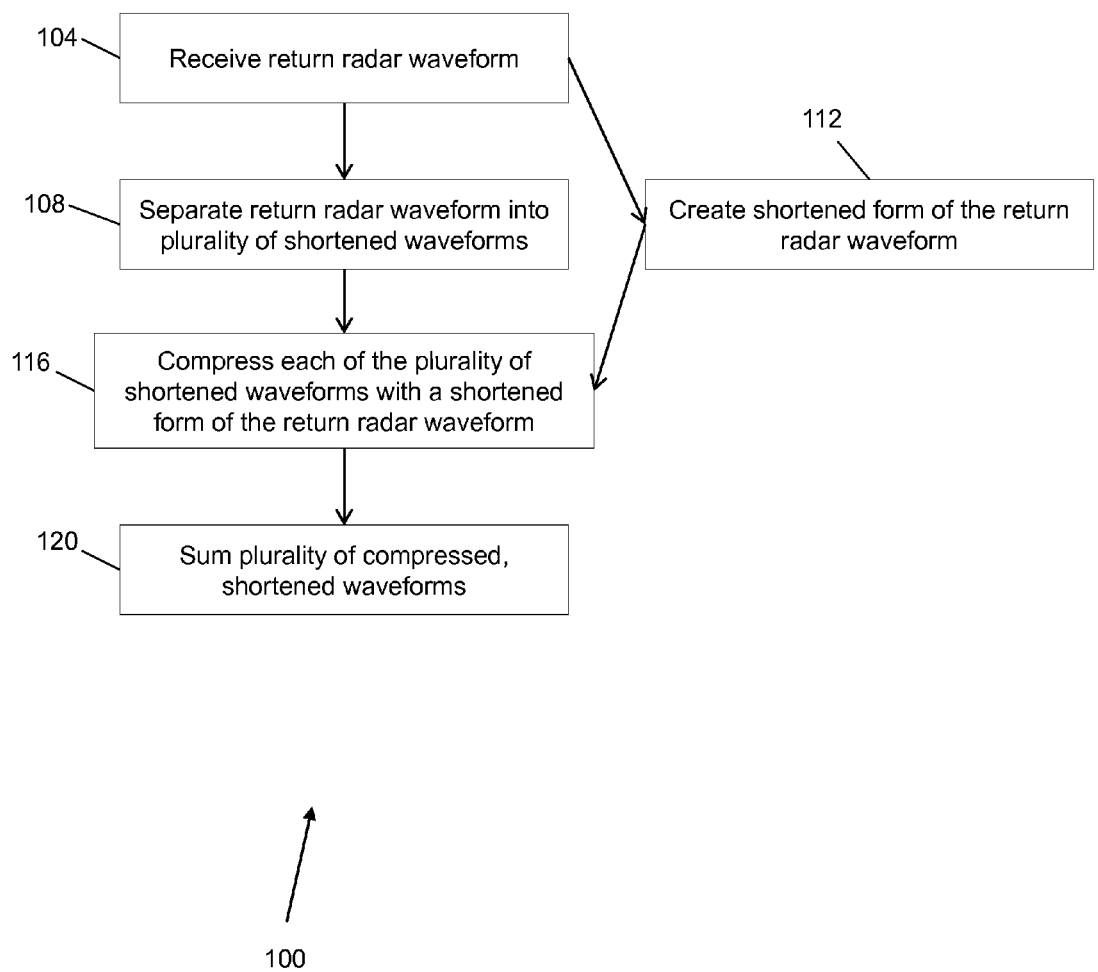
FIG. 1 is a flow diagram illustrating an exemplary method for processing return radar waveforms in response to transmitted waveforms.

FIG. 1 is a flow diagram 100 illustrating an exemplary method for processing return radar waveforms in response to transmitted waveforms. The method includes receiving (step 104), with a processor (e.g., processor 216 of FIG. 1), a return radar waveform having a Doppler shift larger than Doppler tolerance. The Doppler shift is the change in frequency of a radar wave for an observer moving relative to the source of the radar wave. In addition, by way of example, the Doppler tolerance for a pulse waveform radar wave is equal to $$\frac{1}{pw},$$

where pw is the pulse width.

The return radar waveform experiencing a Doppler shift is expressed in accordance with:

$$V_r(k) = R(k)e^{-i\frac{2\dot{r}\omega_0}{c+\dot{r}}\frac{k}{f_s}} \qquad \text{EQN. 1}$$

where $V_r(k)$ is the received radar waveforms, $R(k)$ is the radar return signal (a sampled version of the transmitted radar signal), $$e^{-i\frac{2\dot{r}\omega_0}{c+\dot{r}}\frac{k}{f_s}}$$

is the Doppler shift, $\dot{r}$ is the range-rate in meters/sec (in this embodiment, assumed constant, outbound positive), $\omega_0$ is the carrier frequency in units of radians (i.e., radar transmission frequency), k is the waveform sample number, c is the speed of light in meters/sec, and $f_s$ is the radar receiver sample rate in Hz.

Next, the Doppler shift is applied to the replica in accordance with the following correlation:

$$V_{cp}(k) = \sum_{n=0}^{N-1} V_r(k+n) e^{-i\frac{2\dot{r}\omega_0 k}{c+\dot{r}}\frac{n}{f_s}} R^*(n) \qquad \text{EQN. 2}$$

where $V_{cp}(k)$ is each compressed pulse and $R^*(n)$ is the time domain replica of the returned waveform, which is the conjugate of a copy of the transmitted waveform.

EQN. 2 is then separated into a sum of P pulses by separating (step 108) the return radar waveform into a plurality of shortened waveforms in accordance with:

$$V_{cp}(k) = \sum_{p=0}^{P-1} \left( \sum_{m=0}^{M-1} V_r(k+pM+m) e^{i\frac{2\dot{r}\omega_0}{c+\dot{r}}\frac{pM+m}{f_s}} R^*(pM+m) \right) \qquad \text{EQN. 3}$$

where P is the number of sub-pulses, M is the length of the sub-pulses, m is the sub-pulse number, and N=MP is the length of the entire pulse (where the replica is zero padded if necessary). Zero padding relieves the requirement that M be an exact sub-multiple of the transmitted pulse.

In some embodiments, the return radar waveform is separated into a plurality of shortened waveforms each having a prespecified bandwidth small enough to neglect Doppler effects. In some embodiments, the prespecified bandwidth is determined in accordance with $$SNR = 10 * \log_{10}\left( \frac{\sin(\pi f_d / \tau_{pw})}{\pi f_d / \tau_{pw}} \right) \qquad \text{EQN. 4}$$

where SNR is a prespecified signal-to-noise ratio loss for the system, $f_d$ is the Doppler shift, and $\tau_{pw}$ is the prespecified bandwidth.

The method then assumes the sub-pulses have been selected small enough such that the Doppler effects within each sub-pulse can be neglected by assuming the phase of the signal is substantially constant over each sub-pulse. EQN 3 is then modified in accordance with:

$$V_{cp}(k) = \sum_{p=0}^{P-1} \left( \sum_{m=0}^{M-1} V_r(k+pM+m) e^{i\frac{2\dot{r}\omega_0}{c+\dot{r}}\frac{pM+M/2}{f_s}} R^*(pM+m) \right) \qquad \text{EQN. 5}$$

where the variable m in the Doppler shift element of EQN. 3 is replaced by $$\frac{M}{2}.$$

The method also includes creating a shortened form of the return radar waveform (step 112). pM is the offset into the receive signal for correlator p. Each correlator p includes its portion of the received waveform plus extra samples that cover the range uncertainty. This is accomplished by starting each correlator at sample pM (p is the subpulse number starting at 0) and running it for a number of samples, where the number of samples is equal to M+the size of the range window.

The method then includes compressing each of the plurality of shortened waveforms with a shortened form of the return radar waveform (step 116) in accordance with:

$$V_{cp}(k) = \qquad\qquad\qquad\text{EQN. 6}$$

$$e^{i\frac{2\dot{r}2\omega_0}{c+\dot{r}}\frac{M/2}{f_S}}\sum_{p=0}^{P-1} e^{i\frac{2\dot{r}\omega_0}{c+\dot{r}}\frac{pM}{f_S}} \left(\sum_{m=0}^{M-1} V_r(k+pM+m)R^*(pM+m)\right)$$

In some embodiments, compressing each of the plurality of shortened waveforms with a shortened form of the return radar waveform includes selecting a correlator having a length that is the lesser of a required range window or length of each of the shortened waveforms. The correlation is the portion of the equation inside the parenthesis. The subpulse length sets the correlation length in this case. Once that is selected, there are a variety of methods to implement the correlator itself. Fast convolution is a common way (e.g., FFT, multiply with a conjugate of the FFT (transmitted pulse) inverse FFT). Other methods can be used in alternative embodiments. For example, another way is to implement the correlation directly using signal processing devices.

In some embodiments, compressing each of the plurality of shortened waveforms with a shortened form of the return radar waveform includes convolving each of the plurality of shortened waveforms with a plurality of corresponding segments of a conjugated and time-reversed version of the transmitted radar signal.

In some embodiments, compressing each of the plurality of shortened waveforms with a shortened form of the return radar waveform includes convolving each of the plurality of shortened waveforms with a plurality of corresponding conjugated time-reversed segments of the transmitted radar signal that have been adjusted for time stretching or compression due to high target speed.

The method then includes summing (step 120) the plurality of compressed, shortened waveforms by computing a Doppler Fourier transform for each radar bin of the return waveform using the plurality of compressed, shortened waveforms by performing the calculation in EQN. 6. The method therefore provides processing of non-Doppler tolerant waveforms using a single pulse compression step followed by a Doppler Fourier transform for each Doppler bin, rather than the traditional approach of pulse compressing non-Doppler tolerant waveforms requiring a separate pulse compression step for each Doppler bin.

In another embodiment, the return radar waveform that is received (step 104) is for a target that has a constant range-rate. The return radar waveform is expressed in accordance with (note: this form is more general than EQN. 1 because it can handle larger values of range rate ($\dot{r}$); and $$V_{transmit}\left(\frac{n}{f_S}\right) = R(n)\bigg|:$$

$$V_{receive}(t) = V_{transmit}\left(\frac{c-\dot{r}}{c+\dot{r}}t\right) \qquad\text{EQN. 7}$$

Next, the Doppler shift is applied to the replica in accordance with:

$$V_{cp}(k) = \sum_{n=0}^{N-1} V_r(k+n) e^{i\frac{2\dot{r}\omega_0}{c+\dot{r}}\frac{n}{f_S}} R^*\left(\frac{c+\dot{r}}{c-\dot{r}}n\right) \qquad\text{EQN. 8}$$

EQN. 8 is then broken up into a sum of P pulses by separating (step 108) the return radar waveform into a plurality of shortened waveforms in accordance with:

$$V_{cp}(k) = e^{i\frac{2\dot{r}\omega_0}{c+\dot{r}}\frac{M/2}{f_S}} \qquad\qquad\text{EQN. 9}$$

$$\sum_{p=0}^{P-1} e^{i\frac{2\dot{r}\omega_0}{c+\dot{r}}\frac{pM}{f_S}} \left(\sum_{m=0}^{M-1} V_r(k+pM+m)R^*\left((pM+m)\frac{c+\dot{r}}{c-\dot{r}}\right)\right)$$

The method then includes compressing (e.g., using a Doppler Fourier transform ("DFT") across the sub-pulses) each of the plurality of shortened waveforms with a shortened form of the return radar waveform (step 116) in accordance with:

$$V_{cp}(k) = e^{i\frac{2\dot{r}\omega_0}{c+\dot{r}}\frac{M/2}{f_S}} \sum_{p=0}^{P-1} e^{i\frac{2\dot{r}\omega_0}{c+\dot{r}}\frac{pM}{f_S}} \qquad\text{EQN. 10}$$

$$\left(\sum_{m=0}^{M-1} V_r(k+pM+m)R^*\left(\left(pM+\frac{M}{2}+m-\frac{M}{2}\right)\frac{c+\dot{r}}{c-\dot{r}}\right)\right)$$

The stretching/compressing effects can be ignored within a sub-pulse the m term within R*( ) is set equal to zero yielding the following:

$$V_{cp}(k) = e^{i\frac{2\dot{r}\omega_0}{c+\dot{r}}\frac{M/2}{f_S}} \sum_{p=0}^{P-1} e^{i\frac{2\dot{r}\omega_0}{c+\dot{r}}\frac{pM}{f_S}} \qquad\text{EQN. 11}$$

$$\left(\sum_{m=0}^{M-1} V_r(k+pM+m)R^*\left(\left(\left(pM+\frac{M}{2}\right)\frac{c+\dot{r}}{c-\dot{r}}-\frac{M}{2}\right)+m\right)\right)$$

Figure 2:
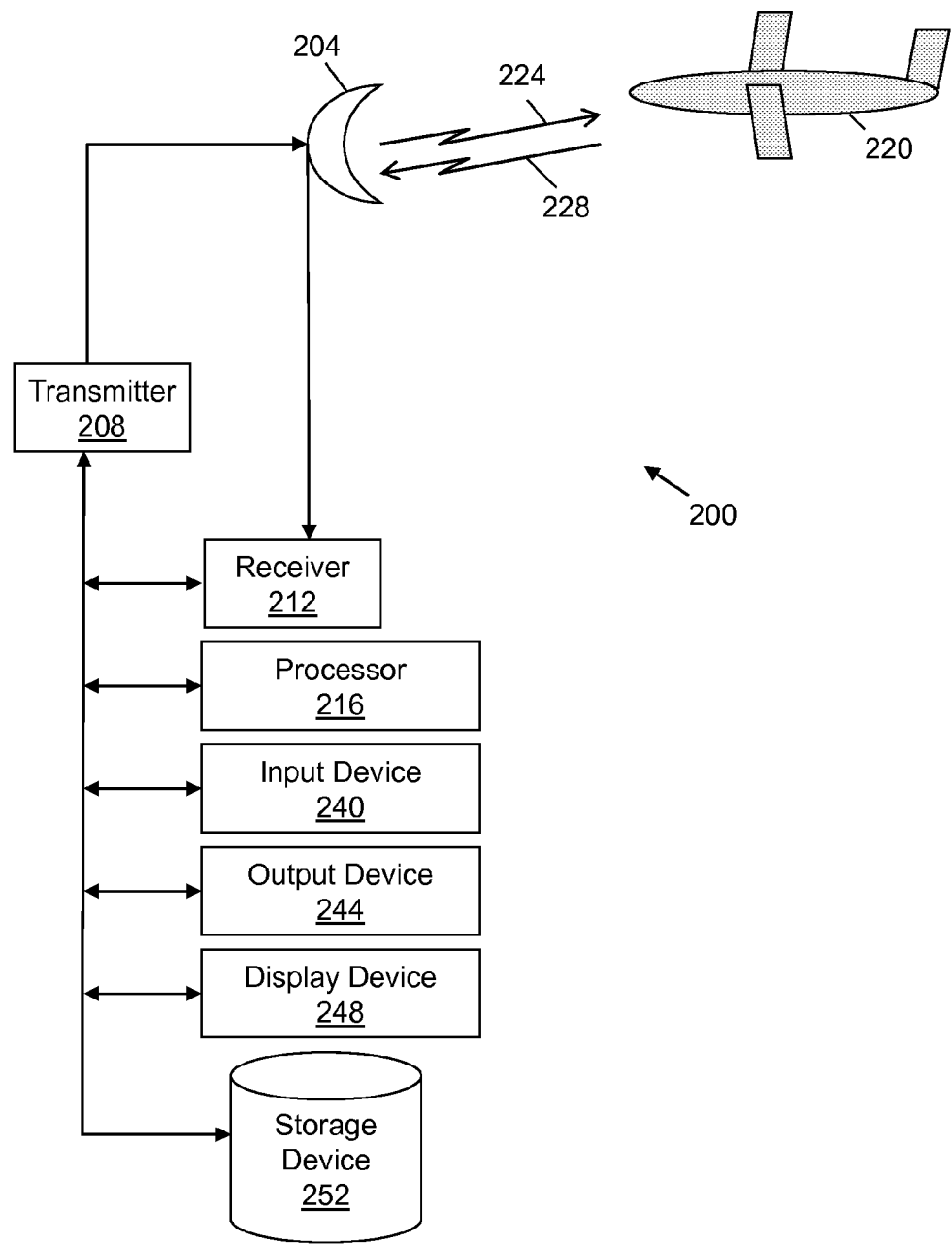
FIG. 2 is a schematic illustration of a synthetic aperture radar (SAR) system, according to an illustrative embodiment.

The method then includes summing (step 120) the plurality of compressed, shortened waveforms by computing a Doppler Fourier transform for each radar bin of the return waveform using the plurality of compressed, shortened waveforms by performing the calculation in EQN. 11. The method therefore provides processing of non-Doppler tolerant waveforms using a single pulse compression step followed by a Doppler Fourier transform for each Doppler bin, rather than the traditional approach of pulse compressing non-Doppler tolerant waveforms requiring a separate pulse compression step for each Doppler bin FIG. 2 is a schematic illustration of a radar system 200, according to an illustrative embodiment. The system 200 includes a processor 216 electrically coupled to a radar signal transmitter 208 and a radar signal receiver 212. The processor 216 can be, for example, an aperture imaging processor or other suitable computer processor used in radar systems for controlling operation of a radar system. The transmitter 208 and receiver 212 are coupled to an antenna 204. The processor 216 provides transmission waveforms to the transmitter 208 which are transmitted by the antenna 204. The transmission waveforms 224 (e.g., radar transmission signals) are directed towards a target 220 (e.g., aircraft, satellite, vehicle, boat) to, for example, determine the range and velocity of the target relative to the antenna 204. Return radar waveforms 228 (e.g., radar return signals reflected back towards the antenna 204 in response to the transmission waveforms 224 impinging upon the target 220) are received by the antenna 204. The receiver 212 receives the response signals from the antenna 204 and directs the signals to the processor 216.

The processor 216 is configured to process the various system 200 signals to determine, for example, ambiguity parameter values (e.g. range ambiguity parameter values, Doppler centroid parameter values, or Doppler parameter values) of the target 220 for system 200. The processor 216 uses the ambiguity parameter values to determine a more accurate measure of target range and/or Doppler velocity. The processor 216 then determines a more accurate measure of the target range and radial velocity.

The modules and devices described herein can, for example, utilize the processor 216 to execute computer executable instructions and/or include a processor to execute computer executable instructions (e.g., an encryption processing unit, a field programmable gate array processing unit, etc.). It should be understood that the system 200 can include, for example, other modules, devices, and/or processors known in the art and/or varieties of the illustrated modules, devices, and/or processors.

The input device 240 receives information associated with the system 200 (e.g., instructions from a user, instructions from another computing device) from a user (not shown) and/or another computing system (not shown). The input device 240 can include, for example, a keyboard or a scanner. The output device 244 outputs information associated with the system 200 (e.g., information to a printer (not shown), information to an audio speaker (not shown)).

The display device 248 displays information associated with the system 200 (e.g., status information, configuration information). The processor 216 executes the operating system and/or any other computer executable instructions for the system 200 (e.g., sends signals to the transmitter 208 for transmission (transmission radar waveforms 224) by the antenna 204, or receives return radar waveforms 228 from the antenna 204).

The storage device 252 stores the various information associated with the system 200 and its operation. The storage device 252 can store information and/or any other data associated with the system 200. The storage device 252 can include a plurality of storage devices. The storage device 252 can include, for example, long-term storage (e.g., a hard drive, a tape storage device, flash memory, etc.), short-term storage (e.g., a random access memory, a graphics memory, etc.), and/or any other type of computer readable storage.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device and/or in a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by, and an apparatus can be implemented as, special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The computing device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The invention claimed is:

1. A method for processing return radar waveforms in response to transmitted radar waveforms, comprising:
receiving, with a processor, a return radar waveform having a Doppler shift larger than Doppler tolerance;
separating, with the processor, the return radar waveform into a plurality of shortened waveforms, wherein a size of each of the plurality of shortened waveforms enables an assumption that a linear phase across a subject shortened waveform is constant;
compressing, with the processor, each of the plurality of shortened waveforms with a shortened form of the return radar waveform;
summing, with the processor, the plurality of compressed, shortened waveforms by computing a Doppler Fourier transform for each radar range bin of the return radar waveform using the plurality of compressed, shortened waveforms; and
using the summed shortened waveforms for at least one of: target identification, target detection, and target tracking.

2. The method of claim 1, comprising separating the return radar waveform into a plurality of shortened waveforms each having a prespecified bandwidth small enough to neglect Doppler effects.

3. The method of claim 2, wherein the prespecified bandwidth is determined in accordance with equation:

$$SNR = 10 * \log_{10}\left(\frac{\sin(\pi f_d / \tau_{pw})}{\pi f_d / \tau_{pw}}\right)$$

where SNR is a prespecified signal-to-noise ratio for the system, $f_d$ is the Doppler shift, and $\tau_{pw}$ is the prespecified bandwidth.

4. The method of claim 1, wherein compressing each of the plurality of shortened waveforms with a shortened form of the return radar waveform comprises selecting a correlator having a length that is the lesser of a required range window or length of each of the shortened waveforms.

5. The method of claim 4, wherein compressing each of the plurality of shortened waveforms with a shortened form of the return radar waveform comprises convolving each of the plurality of shortened waveforms with a plurality of corresponding segments of a conjugated and time-reversed version of the transmitted radar signal.

6. The method of claim 4, wherein compressing each of the plurality of shortened waveforms with a shortened form of the return radar waveform comprises convolving each of the plurality of shortened waveforms with a plurality of corresponding conjugated time-reversed segments of the transmitted radar signal that have been adjusted for time stretching or compression due to high target speed.

7. A system for processing return radar waveforms in response to transmitted radar waveforms, comprising:
a radar signal receiver for receiving a return radar waveform having a Doppler shift larger than Doppler tolerance of the system; and
a processor for:
separating the return radar waveform into a plurality of shortened waveforms, wherein a size of each of the plurality of shortened waveforms enables an assumption that a linear phase across a subject shortened waveform is constant,
compressing each of the plurality of shortened waveforms with a shortened form of the return radar waveform, and
summing the plurality of compressed, shortened waveforms by computing a Doppler Fourier transform for each radar range bin of the return radar waveform using the plurality of compressed, shortened waveforms.

8. A computer program product, tangibly embodied in an information carrier, the computer program product including instructions being operable to cause a radar waveform processing module to:
receive a return radar waveform having a Doppler shift larger than Doppler tolerance;
separate the return radar waveform into a plurality of shortened waveforms, wherein a size of each of the plurality of shortened waveforms enables an assumption that a linear phase across a subject shortened waveform is constant;

compress each of the plurality of shortened waveforms with a shortened form of the return radar waveform; and sum the plurality of compressed, shortened waveforms by computing a Doppler Fourier transform for each radar range bin of the return radar waveform using the plurality of compressed, shortened waveforms.

9. The computer program product of claim 8, wherein the computer program product includes instructions operable to cause a radar waveform processing module to separate the return radar waveform into a plurality of shortened waveforms each having a prespecified bandwidth small enough to neglect Doppler effects.

10. The computer program product of claim 8, wherein the computer program product includes instructions operable to cause a radar waveform processing module to compress each of the plurality of shortened waveforms with a shortened form of the return radar waveform by selecting a correlator having a length that is the lesser of a required range window or length of each of the shortened waveforms.

11. The computer program product of claim 8, wherein compressing each of the plurality of shortened waveforms with a shortened form of the return radar waveform comprises convolving each of the plurality of shortened waveforms with a plurality of corresponding segments of a conjugated and time-reversed version of the transmitted radar signal.

12. The computer program product of claim 8, wherein compressing each of the plurality of shortened waveforms with a shortened form of the return radar waveform comprises convolving each of the plurality of shortened waveforms with a plurality of corresponding conjugated time-reversed segments of the transmitted radar signal that have been adjusted for time stretching or compression due to high target speed.

* * * * *